(12) United States Patent
Leclerc et al.

(10) Patent No.: US 10,746,463 B2
(45) Date of Patent: Aug. 18, 2020

(54) COMPRESSION METHOD AND APPARATUS FOR AN APPARATUS FOR CAPTURING $CO_2$ BY LOW-TEMPERATURE SEPARATION

(71) Applicant: L'Air Liquide, Societe Anonyme pour l'Etude et l'Exploitation des Procedes Georges Claude, Paris (FR)

(72) Inventors: Mathieu Leclerc, Paris (FR); Ludovic Granados, Puteaux (FR); Frederick Lockwood, Paris (FR); Cyril Defaye, Roissy en Brie (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 162 days.

(21) Appl. No.: 15/604,966

(22) Filed: May 25, 2017

(65) Prior Publication Data

US 2017/0343279 A1    Nov. 30, 2017

(30) Foreign Application Priority Data

May 27, 2016 (FR) .................................. 16 54808

(51) Int. Cl.
*F25J 3/00* (2006.01)
*F25J 3/06* (2006.01)
(Continued)

(52) U.S. Cl.
CPC .............. *F25J 3/067* (2013.01); *B01D 3/143* (2013.01); *B01D 53/002* (2013.01); *F25J 3/0223* (2013.01); *F25J 3/0266* (2013.01); *F25J 3/0295* (2013.01); *F25J 3/0625* (2013.01); *F25J 3/0695* (2013.01); *F25J 2210/70* (2013.01); *F25J 2230/02* (2013.01); *F25J 2230/30* (2013.01); *F25J 2260/60* (2013.01);
(Continued)

(58) Field of Classification Search
CPC ........ F25J 3/067; F25J 3/0266; F25J 2280/02; F25J 2280/50; Y02C 10/12; G05D 16/00; G05D 16/024; F25B 2600/11; F25B 2700/13; F25B 2700/1933; F25B 49/022; F25B 2600/0272
See application file for complete search history.

(56) References Cited

U.S. PATENT DOCUMENTS 1,390,829 A * 9/1921 Smoot ................... F04D 27/005
                                                        137/1
5,873,257 A * 2/1999 Peterson ............. F04D 27/0261
                                                        62/129
(Continued)

*Primary Examiner* — Keith M Raymond
(74) *Attorney, Agent, or Firm* — Justin K. Murray

(57) ABSTRACT

In a method for compressing a gas that is to be separated in a low-temperature $CO_2$ separation unit using at least one partial condensation step and/or at least one distillation step, the gas that is to be separated has a variable composition and/or variable flow rate, the gas that is to be separated is compressed in a compressor to produce a compressed gas and the inlet pressure of the gas that is to be separated, entering the compressor, is modified according to the $CO_2$ content and/or the flow rate of the gas that is to be separated so as to reduce the variations in volumetric flow rate of the gas that is to be separated entering the compressor.

12 Claims, 1 Drawing Sheet

(51) Int. Cl.
    *F25J 3/02*   (2006.01)
    *B01D 3/14*   (2006.01)
    *B01D 53/00*  (2006.01)

(52) U.S. Cl.
    CPC ........ *F25J 2270/02* (2013.01); *F25J 2270/80* (2013.01); *F25J 2280/02* (2013.01); *Y02C 10/04* (2013.01); *Y02C 10/12* (2013.01)

(56) References Cited

U.S. PATENT DOCUMENTS

| | | | | |
|---|---|---|---|---|
| 5,927,103 | A * | 7/1999 | Howard | B01D 53/002 62/620 |
| 2006/0130499 | A1* | 6/2006 | Hong | B60H 1/3211 62/176.6 |
| 2011/0219797 | A1* | 9/2011 | Taguchi | B60H 1/3208 62/129 |
| 2013/0115067 | A1* | 5/2013 | Bronfeld | F01D 5/06 415/185 |
| 2013/0259782 | A1* | 10/2013 | Briglia | B01D 53/002 423/220 |
| 2013/0291722 | A1* | 11/2013 | Stallmann | B01D 53/002 95/134 |

* cited by examiner

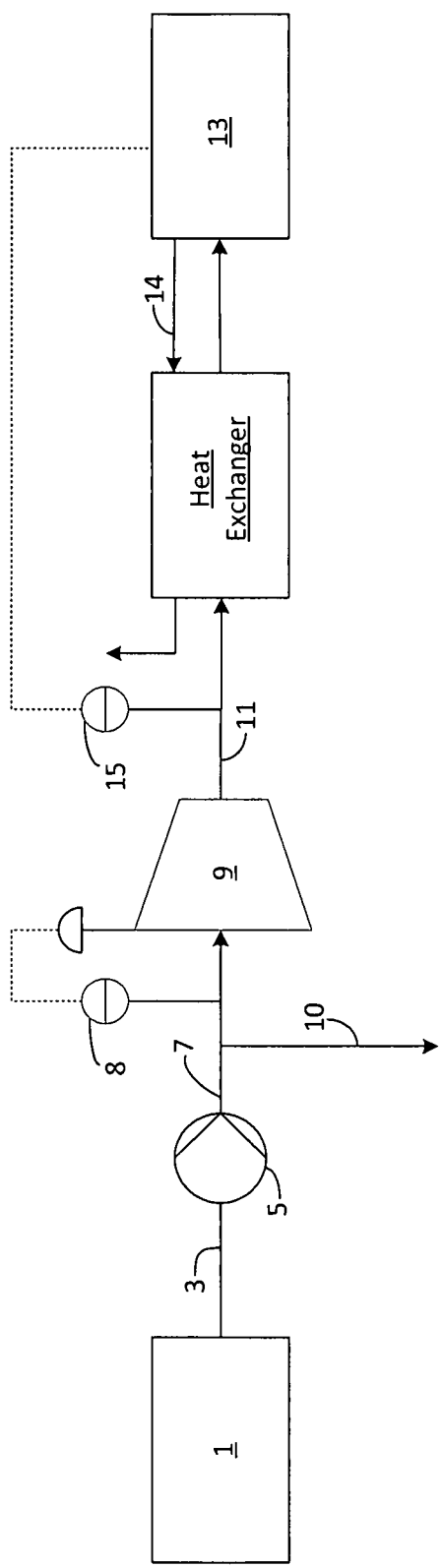

COMPRESSION METHOD AND APPARATUS FOR AN APPARATUS FOR CAPTURING $CO_2$ BY LOW-TEMPERATURE SEPARATION

CROSS REFERENCE TO RELATED APPLICATIONS

This application claims the benefit of priority under 35 U.S.C. § 119 (a) and (b) to French patent application No. FR1654808, filed May 27, 2016, the entire contents of which are incorporated herein by reference.

FIELD OF THE INVENTION

The present invention relates to a method and an apparatus for capturing $CO_2$ by low-temperature separation. The gases to be separated in order to capture the $CO_2$ that they contain are often gases the composition and flow rate of which may vary.

BACKGROUND

The increase in the concentration of carbon dioxide in the atmosphere is largely responsible for global warming. $CO_2$ of human origin is essentially emitted into the atmosphere through the burning of fossil fuels in power stations and in a certain number of industrial units such as cement works, hydrogen production units or even steelworks.

In the context of reducing the emissions of greenhouse gases and/or the production of $CO_2$ used for enhanced oil recovery, a unit that captures and purifies $CO_2$ by cryogenic means can be used downstream of the $CO_2$-emitting plants. The cryogenic capture and purification of $CO_2$ are essentially based on the partial condensation of the $CO_2$ at temperatures close to its triple point, which may be supplemented by one or more distillations to increase the $CO_2$ purity of the end product. In order to perform these partial condensations and distillation, it is going to be necessary to compress the gases that are to be purified, to dry them and then to cool them in order to form a $CO_2$-enriched liquid phase and a gaseous phase enriched in incondensable gases that will be separated in one or more partial condensation pots. With this kind of method, capture efficiencies of between 80 and 95% are achievable.

The liquid $CO_2$ obtained is usually separated into at least two streams. The first stream is vaporized directly against the gas that is to be purified to supply the frigories at the highest temperatures. The second stream is expanded before being vaporized so as to supply the frigories necessary for cooling the gas that is to be purified to the lowest temperatures of the cryogenic part, namely to temperatures close to the triple point of $CO_2$. These (at least) two vaporized streams are then compressed in a CO $CO_2$ compressor the streams at the lowest pressures being injected into the compressor further upstream than the other streams of $CO_2$.

The principles of partial condensation and of distillation are based on the partial pressure of each constituent of the gas. In the context of $CO_2$ capture and purification, the partial pressure of $CO_2$ at the inlet to the cryogenic part of the method is thus a key parameter in the sizing of the separation equipment.

For example, the lower the partial pressure of $CO_2$:
the more the gas will need to be cooled in order to begin to condense it, which means to say in order to begin to form the $CO_2$-enriched liquid phase
as a result, the distribution of the liquid $CO_2$ between the low-pressure streams and those not being expanded will need to be adjusted: the flow rates of expanded liquid $CO_2$ will be increased in order to supply more low-temperature frigories
for the same ultimate cooled temperature, the lower the $CO_2$ recovery efficiency will be
and vice versa.

If the composition of the gas that is to be purified changes, the partial pressure of $CO_2$ will change. That modifies the exchanges of heat needed and thus the distribution of the "low" and "medium" pressure streams of $CO_2$ that are needed to supply the correct amounts of cold at the various temperatures. Hence, the sizing of the $CO_2$ compressor will therefore need to take into account the fact that the distribution between the lower-pressure fluids and the other fluids resulting from the vaporization of the liquid $CO_2$ has changed. That will lead to oversizing and mean that the operation of the compressor is not optimal. For example, if the $CO_2$ composition of the gas that is to be purified drops with respect to the nominal $CO_2$ composition, the compressor will need to be capable of compressing the low-pressure flow rate that is increased over and above its nominal value. The compressor will therefore need to be sized for the operating scenario of the low composition, by increasing its capacity. In nominal operation, when the composition is nominal, the flow rate sent to the compressor will therefore be well within its capacities, so its operation will therefore not be optimal.

In addition, it may happen that the liquid streams of $CO_2$ are vaporized in exchangers which are distinct from one another according to their pressure and/or temperature following expansion. As a result, the change in distribution between the various fluids which will need to be vaporized will have an impact on the performance of these heat exchangers. According to the same example as before, the exchanger in which the lowest-pressure fluid vaporizes will need to be sized for the low-composition operating scenario and will therefore be oversized for the scenario of operating with the nominal composition. The reverse is true of the other exchanger regarding the other level or levels of vaporization: it will be oversized for operation at low composition.

SUMMARY OF THE INVENTION

In order to avoid these various oversizings, which will affect the price and performance of the capture unit, the proposed solution is to provide a design of compressor for the gas that is to be purified that allows a variation in outlet pressure. This pressure will then be controlled according to the $CO_2$ composition of the gas that is to be purified in order to achieve substantially the same $CO_2$ partial pressure at the inlet to the cryogenic part whatever the composition of the gas that is to be purified. All the on-costs and losses of efficiency of the cryogenic part and of the $CO_2$ compressor are therefore avoided, and these will be easier to control because substantially the same phenomena will occur within the cryogenic part whatever the quality of the gas that is to be treated.

In most cases, a variation in the $CO_2$ composition of the gas that is to be purified is accompanied by a change to the flow rate of the gas that is to be purified. The change in compressor outlet pressure of the gas that is to be purified as a function of the $CO_2$ composition will also make it possible to adjust the volumetric flow rate entering the cryogenic part. By contrast, the inlet to this compressor will be affected by the changes in volumetric flow rate. It is possible to conceive of oversizing this compressor, but the costs and performance of the unit would be modified as a result especially given that this compressor represents the greatest proportion of the capture and purification costs.

In instances in which the compression of the gas that is to be purified begins in a fan, the solution proposed involves oversizing this fan, which will have a marginal impact on the total cost, and controlling its outlet pressure (oversizing a fan is less expensive than oversizing a main compressor). The outlet pressure of this fan will therefore be adjusted so as to achieve a volumetric flow rate that remains substantially the same whatever the quality of the gas that is to be purified. Thus, the sizing of the main compressor of the unit will be unaffected and it will be more easy to control because its inlet volumetric flow rate will remain constant: control over the pressure at the outlet of the main compressor will not be impacted by undesired variations in its inlet volumetric flow rate. For problems with the control and sizing of the fan, a second fan may also be used in parallel so as not to oversize the main fan. As a result, an output pressure higher than its nominal pressure may be demanded of the main fan without it also having to cope with an additional flow rate compared to its nominal flow rate.

According to one subject of the invention, there is provided a method for compressing a gas that is to be separated in a low-temperature $CO_2$ separation unit using at least one partial condensation step and/or at least one distillation step, in which the gas that is to be separated has a variable composition and/or variable flow rate, the gas that is to be separated is compressed in a compressor to produce a compressed gas, characterized in that the inlet pressure of the gas that is to be separated, entering the compressor, is modified according to the $CO_2$ content and/or the flow rate of the gas that is to be separated so as to reduce the variations in volumetric flow rate of the gas that is to be separated entering the compressor.

According to other optional aspects:
- If the $CO_2$ content of the gas that is to be separated drops and/or the flow rate of the gas that is to be separated increases, the pressure of the gas that is to be separated, at the inlet to the compressor, is increased.
- The volumetric flow rate of the flow of gas that is to be separated entering the compressor is substantially constant.
- The gas that is to be separated is pressurized upstream of the compressor by means of at least one fan which produces a variable-pressure flow rate.
- At least a proportion of the gas compressed in the fan is sent to the compressor to be compressed.
- The composition of the flow compressed in the fan is not modified between the fan and the compressor.
- At least part of the flow compressed in the fan is separated between the fan and the compressor to clean it of NOx and/or of SOx and/or of dust.
- The fan is made up of two fan blowers connected in parallel or of a single fan blower.
- The fan has a compression ratio of less than 2 and/or has just one single compression impellor.
- The gas that is to be separated contains at least 35 dry mol % $CO_2$.
- The gas that is to be separated contains at least 50 dry mol % $CO_2$.
- The gas that is to be separated contains at least 80 dry mol % $CO_2$.
- The gas that is to be separated contains $CO_2$ and at least one other gas found in the group comprising methane, oxygen, nitrogen, argon, hydrogen, carbon monoxide.
- The gas that is to be separated comes from an oxycombustion unit or a cement works.

According to another subject of the invention there is provided a method of separating a gas that is to be separated in a low-temperature $CO_2$ separation unit in which the gas that is to be separated is compressed as described hereinabove, cooled in a heat exchanger, separated by at least one partial condensation step and/or at least one distillation step to produce a $CO_2$-rich flow and a fluid resulting from the partial condensation and/or distillation heats up in the heat exchanger.

For preference, the fluid is a liquid, preferably rich in $CO_2$, which vaporizes at at least one pressure in the heat exchanger.

According to another aspect of the invention, there is provided an apparatus for compressing a gas that is to be separated in a low-temperature $CO_2$ separation unit using at least one partial condensation step and/or at least one distillation step, in which the gas that is to be separated has a variable composition and/or variable flow rate, comprising a compressor for compressing the gas that is to be separated to produce a compressed gas, characterized in that it comprises means for modifying the inlet pressure of the gas that is to be separated, entering the compressor, according to the $CO_2$ content and/or the flow rate of the gas that is to be separated so as to reduce the variations in volumetric flow rate of the gas that is to be separated entering the compressor.

The said fan could also be the one situated upstream of the $CO_2$ capture process in the "conventional" flue-gas treatment sequence of an energy production plant (deNOx and/or deSOx and/or filtration, etc.). This fan (an inducted draft fan or ID fan) is used to draw out the flue gases from the boiler.

What is meant here by a "fan" or "fan blower" is a compressor of which the energy expenditure, as a result of the treated gas flow rate and compression ratio, is considerably lower than that of the main compressor of the installation, and for example of the order of 2 to 6% thereof. The compression ratio of such a fan blower is generally lower than 2.

A "$CO_2$-rich" gas or fluid contains at least 35% $CO_2$, or even at least 50% $CO_2$ or even at least 80% $CO_2$.

A volumetric flow rate that is substantially constant varies by less than 5%, or even than 2%.

BRIEF DESCRIPTION OF THE DRAWINGS

These and other features, aspects, and advantages of the present invention will become better understood with regard to the following description, claims, and accompanying drawing(s). It is to be noted, however, that the drawing(s) illustrate only several embodiments of the invention and are therefore not to be considered limiting of the invention's scope as it can admit to other equally effective embodiments.

The FIGURE shows an embodiment of the invention.

DETAILED DESCRIPTION OF THE INVENTION

Certain embodiments of the invention will be described in greater detail with reference to the FIGURE.

The gas that is to be separated is generated by an energy generation unit (but could for example come from a cement works), which may for example comprise an oxycombustion unit followed by a series of units for scrubbing the $CO_2$-rich gas of NOx and/or of SOx and/or of dust. The generation unit 1 produces a gas 3 containing at least 50 dry mol % carbon dioxide, as well as other gases that may be hydrogen, carbon monoxide, oxygen, nitrogen and argon. Depending on the fuel used for the oxycombustion, the composition and therefore in general the flow rate of this gas 3 may vary. This gas 3 is compressed by a fan 5 having a compression ratio of at most 2 to produce a gas 7 at a pressure slightly above atmospheric pressure. At least a proportion of the gas 7 is compressed by a compressor 9. The other proportion (gas 10) may be recirculated to the generation unit 1 when the fan is used for drawing the flue gases (ID fan). The gas 11 produced by the compressor 9 is cooled in a heat exchanger then sent to a separation unit using partial condensation and/or distillation to produce at least one $CO_2$-rich fluid. At least one fluid 14 produced by the partial condensation and/or distillation heats up or even vaporizes in the heat exchanger.

If the $CO_2$ content of the gas 11 drops at the inlet to the separation unit 13, that means that the $CO_2$ in the gas 3 is diluted with incondensable gases and therefore that the flow rate of the gas 11 entering the Cryogenic Purification Unit ("CPU") increases. In that case, the pressure at the outlet of the fan 5 needs to be increased in order to decrease the volumetric flow rate at the inlet to the compressor 9.

Likewise, if the $CO_2$ content of the gas 11 increases at the inlet to the separation unit 13, that means that the $CO_2$ in the gas 3 is less diluted by incondensable gases and therefore that the flow rate of the gas 11 entering the CPU drops. In this case, the pressure at the outlet of the fan 5 needs to be reduced in order to increase the volumetric flow rate at the inlet to the compressor 9.

In the example, the pressure at the inlet to the compressor 9 is regulated according to the flow rate 11 measured by the flow meter 8 for the gas 7 and/or of the flow meter 15 for the gas 11 is used. This pressure is varied by modifying the compression ratio of the fan 5.

Thus, if the flow rate 7 is 110 000 m$^3$/h, the pressure at the inlet to the compressor 9 will be 1.17 bar, whereas if the flow rate 7 increases to 136 000 m$^3$/h, the pressure at the inlet to the compressor 9 will be just 1.01 bar. In the former instance, the flow rate 7 will be 127 000 m$^3$/h and in the latter, 126 500 m$^3$/h.

Thus, for a volumetric flow rate 7 that increases by 24%, the volumetric flow rate 7 drops by less than one percent and therefore remains substantially constant.

It will be appreciated that, between the point at which the flow 10 is bled off and the compressor 9, the gas coming from the fan 5 may be cleaned in different ways, for example to remove NOx and/or SOx.

Otherwise, the fan may be a fan 5 all of the compressed gas from which is sent to the compressor 9. In that case, the flow 10 does not exist and the flow 7 is not cleaned between the fan 5 and the compressor 9.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for compressing a feed gas comprising $CO_2$, in which the feed gas has a variable composition and/or variable flow rate, the method comprising the steps of:
   measuring operational values, wherein the operational values comprise the $CO_2$ content of the feed gas and the flow rate of the feed gas;
   compressing the feed gas in a main compressor to produce a compressed gas; and
   modifying the inlet pressure of the feed gas, when entering the main compressor, according to the measured operational values, thereby reducing variations in volumetric flow rate of the feed gas entering the main compressor.

2. The method according to claim 1, wherein if the $CO_2$ content of the feed gas drops, the pressure of the feed gas, at the inlet to the main compressor, is increased.

3. The method according to claim 1, wherein the volumetric flow rate of the flow of feed gas entering the main compressor is substantially constant.

4. The method according to claim 1, wherein the feed gas is pressurized upstream of the main compressor by means of at least one fan which produces a variable-pressure flow rate.

5. The method according to claim 4, wherein the composition of the flow compressed in the at least one fan is not modified between the at least one fan and the main compressor.

6. The method according to claim 4, wherein the flow compressed in the at least one fan is separated between the at least one fan and the main compressor to clean it of NOx and/or of SOx and/or of dust.

7. The method according to claim 4, wherein the at least one fan is made up of two fan blowers connected in parallel or of a single fan blower.

8. The method according to claim 4, wherein the at least one fan has a compression ratio of less than 2.

9. The method according to claim 1, wherein the feed gas contains at least 35 dry mol % $CO_2$.

10. The method according to claim 1, further comprising the steps of:

cooling the compressed gas in a heat exchanger to form a cooled gas;

separating the cooled gas by at least one partial condensation step and/or at least one distillation step to produce a $CO_2$-rich flow; and heating a fluid resulting from the partial condensation and/or distillation in the heat exchanger.

11. The method according to claim 10, wherein the fluid is a liquid, rich in $CO_2$, which vaporizes in the heat exchanger.

12. An apparatus for compressing a feed gas comprising $CO_2$, in which the feed gas has a variable composition and/or variable flow rate, the apparatus comprising a main compressor configured to compress the feed gas to produce a compressed gas; and means for modifying the inlet pressure of the feed gas entering the compressor according to the $CO_2$ content and the flow rate of the feed gas so as to reduce the variations in volumetric flow rate of the feed gas entering the compressor.

* * * * *